(12) United States Patent
De Oliveira et al.

(10) Patent No.: US 10,641,133 B2
(45) Date of Patent: May 5, 2020

(54) MANAGING WATER-SUPPLY PUMPING FOR AN ELECTRICITY PRODUCTION PLANT CIRCUIT

(71) Applicant: ELECTRICITE DE FRANCE, Paris (FR)

(72) Inventors: Eric De Oliveira, Croissy sur Seine (FR); Denis Vautrin, Nanterre (FR); Nicolas Bousquet, Vincennes (FR); Nicolas Paul, Montreuil (FR); Kersane Zoubert-Ousseni, Grenoble (FR)

(73) Assignee: ELECTRICITE DE FRANCE, Paris (FR)

( * ) Notice: Subject to any disclaimer, the term of this patent is extended or adjusted under 35 U.S.C. 154(b) by 33 days.

(21) Appl. No.: 16/092,064

(22) PCT Filed: Apr. 21, 2017

(86) PCT No.: PCT/EP2017/059578
§ 371 (c)(1),
(2) Date: Oct. 8, 2018

(87) PCT Pub. No.: WO2017/186603
PCT Pub. Date: Nov. 2, 2017

(65) Prior Publication Data
US 2019/0120087 A1  Apr. 25, 2019

(30) Foreign Application Priority Data

Apr. 28, 2016 (FR) ...................................... 16 53811

(51) Int. Cl.
*F01K 9/00* (2006.01)
*G21D 1/04* (2006.01)
(Continued)

(52) U.S. Cl.
CPC ............... *F01K 9/003* (2013.01); *G21D 1/04* (2013.01); *G21D 3/04* (2013.01); *B01D 29/07* (2013.01);
(Continued)

(58) Field of Classification Search
CPC . F01K 9/003; G21D 1/04; G21D 3/04; G21C 13/02; G21C 19/307; B01D 29/07; B01D 29/52; B01D 29/39
See application file for complete search history.

(56) References Cited

U.S. PATENT DOCUMENTS 4,006,596 A     2/1977  Mikolics et al.
5,060,600 A  * 10/1991  Brown .................... F01K 21/06
                                                  122/1 R
(Continued)

FOREIGN PATENT DOCUMENTS

DE      37 32 633 A1    4/1989
WO      02/090719 A1   11/2002

*Primary Examiner* — Mark A Laurenzi
*Assistant Examiner* — Shafiq Mian
(74) *Attorney, Agent, or Firm* — Faegre Drinker Biddle & Reath LLP (57) ABSTRACT

A method for assisting with the management of a pumping device capable of supplying a circuit of a power production facility with water taken from a natural watercourse is disclosed here. In particular, at least some parameters relating to a watercourse and having an influence on the quantity of materials liable to clog filters are collected. A statistical model is developed that is at least based on historical data for said parameters relating to the watercourse for which clogging of the filters has been observed. Current parameters relating to at least the watercourse are collected and said statistical model is used in conjunction with said current parameters to assess the risk of an influx of clogging materials, and an alert signal for deactivating the pumping (Continued)

device at a selected time is generated on the basis of the assessed risk.

11 Claims, 4 Drawing Sheets

(51) Int. Cl.
    *G21D 3/04*          (2006.01)
    *B01D 29/07*        (2006.01)

(52) U.S. Cl.
    CPC ............... *Y02E 30/40* (2013.01); *Y02E 60/17* (2013.01); *Y02P 90/50* (2015.11)

(56) References Cited

U.S. PATENT DOCUMENTS

| | | | |
|---|---|---|---|
| 5,759,398 A * | 6/1998 | Kielbowicz | B01D 25/02 210/416.1 |
| 6,355,082 B1 * | 3/2002 | Ishibe | B01D 39/2027 55/528 |
| 6,594,849 B1 * | 7/2003 | Nimens | B08B 9/045 134/169 C |
| 9,770,680 B2 * | 9/2017 | Haque | B01D 29/07 55/528 |
| 2009/0188645 A1 | 7/2009 | Harpster et al. | |
| 2010/0200398 A1 * | 8/2010 | Thiruppathi | C02F 1/4618 204/274 |
| 2012/0273407 A1 * | 11/2012 | Haque | B01D 29/07 210/335 |
| 2013/0035774 A1 * | 2/2013 | Warren | A01G 25/167 700/90 |

* cited by examiner

MANAGING WATER-SUPPLY PUMPING FOR AN ELECTRICITY PRODUCTION PLANT CIRCUIT

CROSS-REFERENCE TO RELATED APPLICATIONS

This application is the U.S. national phase of the International Patent Application No. PCT/EP2017/059578 filed Apr. 21, 2017, which claims the benefit of French Application No. 16 53811 filed Apr. 28, 2016, the entire content of which is incorporated herein by reference.

FIELD

The present invention relates to the field of water-supply pumping for a circuit of a power production facility.

BACKGROUND

In some power plants, particularly nuclear power plants, the heat sink is provided using water taken from natural watercourses (sea water, river water). This water is pumped by a pumping device in order to inject it into the cooling circuit.

However, this water may contain algae, marine sediments, river detritus, etc. Of course, the water is usually filtered to prevent these elements from dogging the cooling circuit. For this purpose, filtering drums are used upstream of the circuit.

Figure 1:
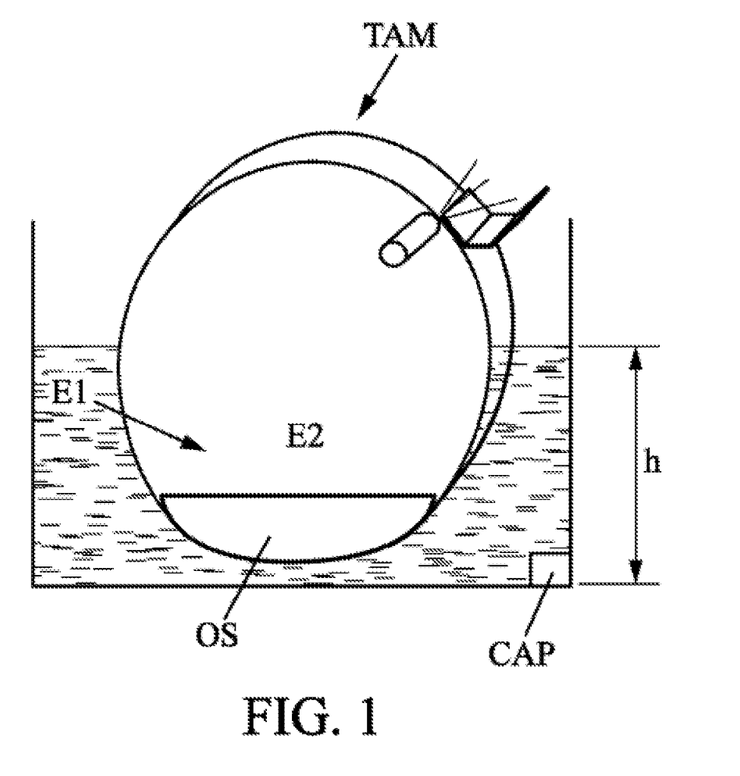
FIG. 1 schematically illustrates a drum of a pumping device supplying water to a power production facility, FIG. 2 schematically illustrates a comprehensive system comprising a device in the meaning of the invention.
Figure 2:
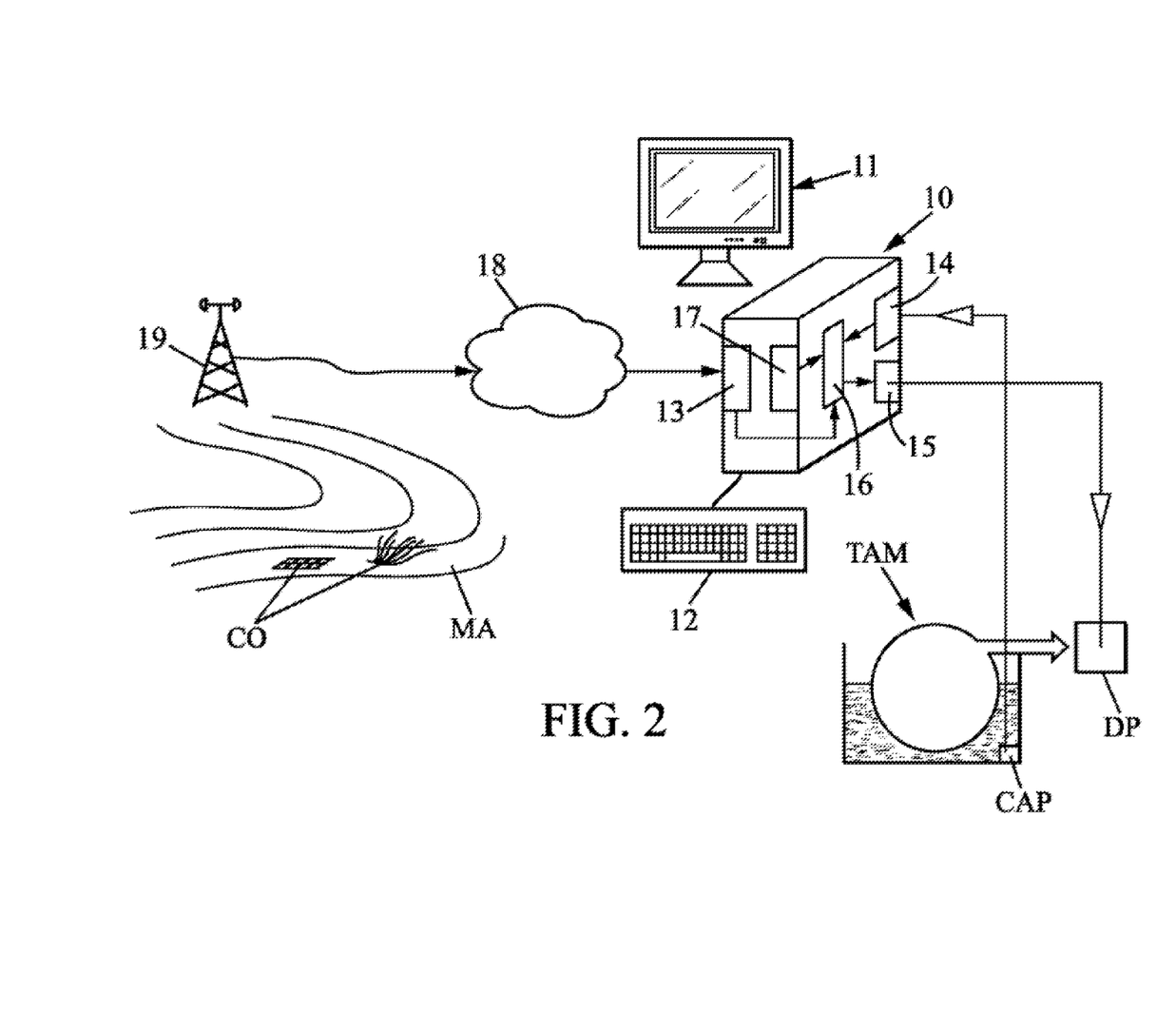

These drums can be rotated to eject clogging elements (called "clogging agents" below). The rotational speed of these drums can be varied according to their degree of clogging. This degree of clogging is measured as a function of a pressure difference, or of water levels observed on either side of a wall in which the filtering drum is placed, as shown for example in FIG. 1. Referring to FIG. 1, a filtering drum TAM typically comprises screens for filtering untreated water E1 and delivering filtered water E2 through outlets OS. Referring now to FIG. 2, this filtered water E2 can be provided to a pumping device DP supplying the water circuit (not shown) of a power production facility. A sensor CAP (for example measuring the water level h in a chamber containing the drum TAM) can give an indication of the degree of clogging: for example, the greater the clogging of the drum the higher the level h. Specifically, the sensor CAP can measure the difference in water level between the water inside and outside the filtering drums (referred to as "screen headloss"). In general, the measurement from the sensor CAP is used by a rotation control unit (not shown) for the drum, in particular in order to apply the necessary rotation speed to the drum for the most effective filtering.

When the clogging agents are such that excessive screen headloss is observed and it then becomes difficult to use this water supply E2, an operator (human) may decide to shut down the pumping device, which can have consequences leading to shutdown of a generator.

Currently, the decision is made by a human operator. The stakes involved in this decision are significant because one needs to:
 ensure that the influx of clogging agents is indeed of the type requiring the shutdown of the pumping device, possibly the shutdown of a generator, and
 where appropriate, anticipate a massive influx of clogging agents in order to take the necessary measures to avoid damage to the equipment of the production facility.

The present invention improves the situation.

SUMMARY

For this purpose, it proposes a method for assisting with the management of a pumping device capable of supplying a circuit of a power production facility with water taken from a natural watercourse, the water upstream of the circuit containing materials liable to clog one or more filters provided at the inlet to the circuit. In this method, at least parameters relating in particular to the watercourse are collected, these parameters having an influence on the quantity of materials liable to clog said filters, and:
 during a previous step, a statistical model is developed that is at least based on historical data for said parameters relating to the watercourse for which clogging of the filters has been observed,
 during a current step, current parameters relating to at least the watercourse are collected and the above statistical model is used in conjunction with the current parameters to assess a risk of an influx of clogging materials, and
 an alert signal for deactivating the pumping device at a selected time is generated on the basis of the assessed risk.

The method of the invention thus provides reliable assistance in the decision to deactivate the pumping device, this deactivation usually accompanying a generator shutdown which has an economic impact on the plants operator. On the other hand, complete blockage of the drums while the facility is operating can cause numerous incidents. With the invention, the risk assessment can be more objective and the shutdown can be justified objectively.

In one embodiment, the alert signal is generated for the further purpose of deactivating the pumping device for a duration selected in accordance with the assessed risk.

This embodiment thus allows deciding both when the pumping device can be shut down as well as the duration of that shutdown.

In an embodiment where the water to be pumped comprises seawater, the parameters relating to the watercourse include at least one tidal coefficient.

Such an embodiment typically concerns seaside facilities and the tidal coefficient is typically one possible descriptor for determining whether the tide is carrying detritus (the abovementioned clogging elements) in this example.

However, the tidal coefficient is not the only possible parameter, and said parameters relating to the watercourse may additionally or alternatively include hydrological data from at least one high tide/low tide.

Also additionally or alternatively, the water to be pumped may comprise water from a river and the parameters relating to the watercourse include hydrological data comprising an average flow rate and/or a water level in the river. For example, in the case of an estuary by the sea, one can typically also take into account the tidal coefficient and/or the time of a high tide/low tide in addition to the average flow rate.

The parameters relating to the watercourse may further include meteorological data on the speed and direction of the wind relative to the watercourse.

In one embodiment, during the current step, current clogging parameters for the filters are further collected and the statistical model is used with:
 current parameters relating to the watercourse, and
 current clogging parameters.

It is thus possible to use sensors (pre-existing as described below) to enhance the input to the model with parameters measured in real time in situ.

For example, the filters may comprise filtering drums rotated so as to eject some or all of the clogging materials as described above. Usually the rotational speed of the drums is controlled on the basis of clogging information collected by at least one sensor. The above clogging parameters may therefore include clogging information collected by this sensor. This may typically be the sensor CAP presented above with reference to FIG. 1.

In one embodiment, the statistical model applied is for example derived from an application of the Parzen window method with descriptors comprising:

parameters relating to the watercourse, and
clogging parameters.

Of course, Gaussian or other models may be alternatively be provided.

The invention also relates to a computer program comprising instructions for implementing the above method, when this program is executed by a processor.

It also relates to a device for assisting with the management of a pumping device, comprising a processing circuit for implementing the above method.

Thus, application of the invention refines the clogging diagnosis and provides an alert signal concerning an actual influx of clogging material. This signal may take the form of a message on a human-machine machine intended for a user (human operator), possibly with quantitative data communicated to the user, or may be a control signal directly to the pumping device in order to deactivate it at a selected time that is predicted for the influx of clogging agents (shutting down the pumping device or at least modifying its operating settings for example).

BRIEF DESCRIPTION OF THE DRAWINGS

Other features and advantages of the invention will be apparent from examining the detailed description of embodiments given below and from examining the accompanying drawings, wherein.

DETAILED DESCRIPTION

We will first refer to FIG. 2, in which a processing unit 10, for example a computer available to a user and/or also capable of controlling the pumping device DP, comprises, in the example shown:

an input interface 13 for receiving, via a network 18, meteorological data (for example from a station 19) as well as hydrological data (tidal coefficient, time of high tide/low tide, water level of a river or stream, flow rate, etc.); typically it can be an internet connection or a connection to any network;

an input interface 14 connected to the sensor CAP (for example via a local area network, wired or wireless) in order to obtain clogging data in situ for the drums TAM, an output interface 15 for controlling the pumping device DP, in the case of a fully automated implementation without requiring operator intervention, a processor 16 capable of cooperating with said input and output interfaces and with a memory 17 (including persistent storage particularly for instructions of the computer program in the meaning of the invention, as well as a possibly temporary storage for calculation data for example).

The processing unit 10 may further comprise additional connections to:

a screen 11 to allow an operator to view for example an alert message that an influx of clogging elements CO is imminent (for example debris and algae arriving in a few hours with the tide MA); and an input device 12 such as a keyboard, a touch screen, or other device, for confirming for example a command to shut down the pumping device DP.

Based on various pieces of information acquired by the input interfaces, the processor 16 is thus capable of executing the method disclosed above in order to alert the operator, or to directly deactivate the pumping device DP.

Figure 3:
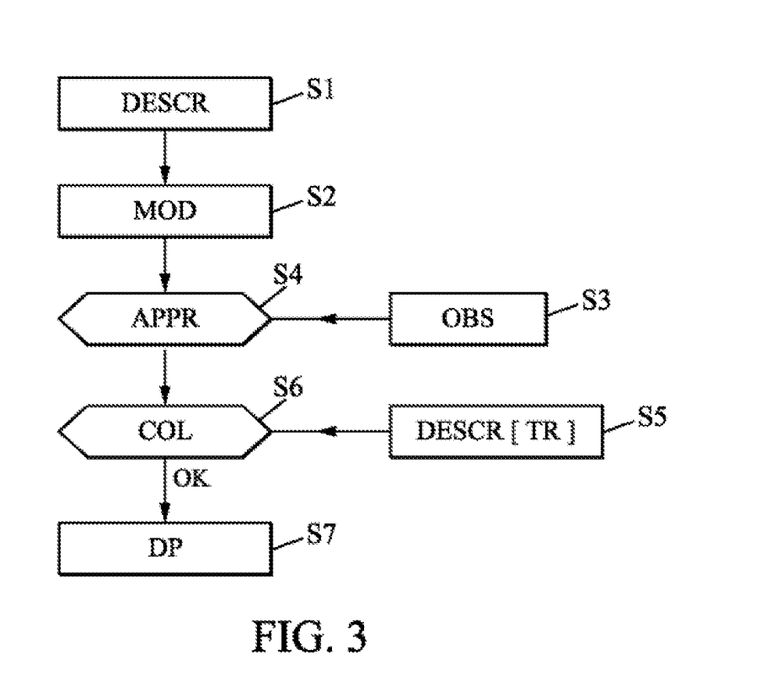
FIG. 3 illustrates the steps of a method according to one exemplary embodiment of the invention.

We now refer to FIG. 3 to describe the method implemented by the processing unit 10. The first step S1 consists of considering a choice of descriptors. These typically can be parameters derived from hydrological and meteorological measurements and from the controlled rotation speed of the drums (medium speed or high speed, controlled in response to the signal sent by the sensor CAP). In the exemplary embodiment presented below for an application in an estuary, six of these descriptors were chosen in step S1 and in this embodiment are:

a minimum measured water level,
a minimum water elevation,
a time difference from a previous peak flow rate,
a sum over three tides of the maximum number of triggered drum rotations at medium speed,
a sum over three tides of the maximum number of triggered drum rotations at high speed,
a maximum total duration of drum rotations at high speed during a tide.

Figure 4A:
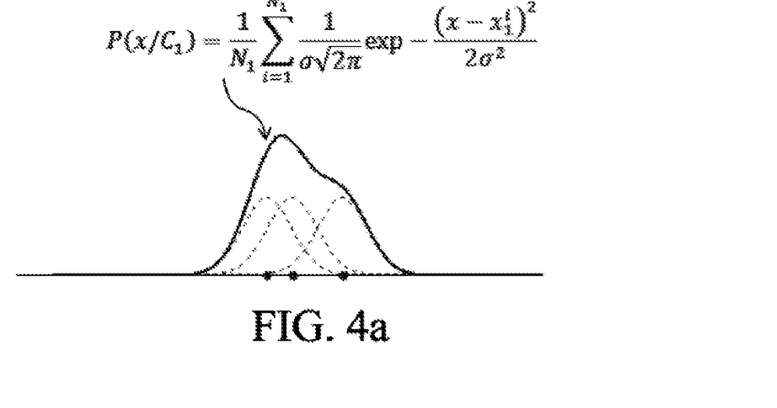
FIGS. 4a and 4b illustrate likelihood functions for the implementation of a classification method in one exemplary embodiment, for training a decision rule (whether or not to shut down a pumping device)
Figure 4B:
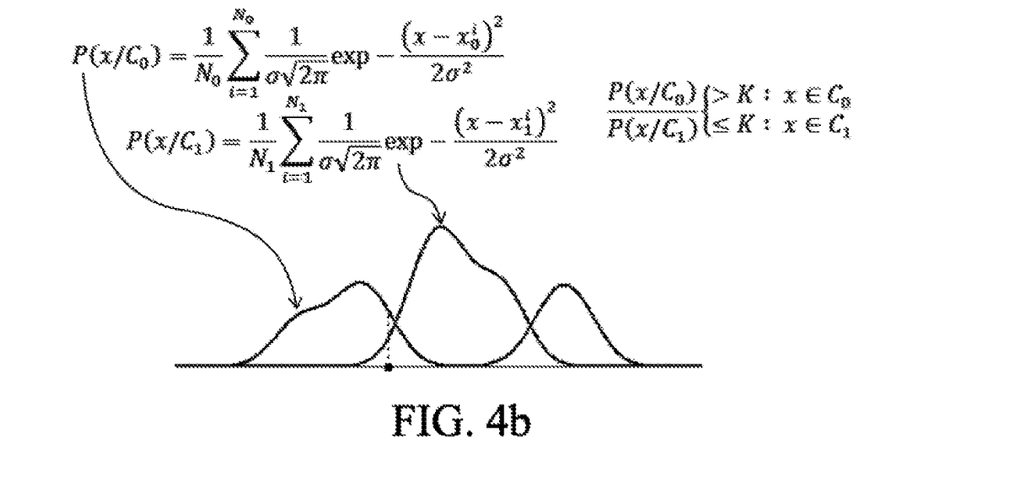

The second step S2 consists of selecting a particular model. In the example described below, a classification method is chosen that uses likelihood functions, here Parzen, as shown in FIG. 4a. One can thus construct classes with several likelihood functions and apply thresholding with respect to a variable K, as illustrated in FIG. 4b.

Thus, from historical data collected in step S3 (over several decades for example) from which descriptor values are defined, it is possible to apply thresholding to define an alert level beyond which it is necessary to stop pumping. Thus, in step S4, it is possible to establish a rule which decides, by machine learning, whether or not to stop pumping, based on the current values of the descriptors.

It is understood that steps S1 to S4 are steps preceding a current step S6 in which, based on the current values of six descriptors obtained in real time in step S5, one can quantitatively determine the clogging risk, and when a risk limit value is exceeded in this step S6, the processing unit 10 can order the shutdown of the pumping device in step S7.

The invention thus allows determining and warning of an impending influx of clogging agents on the fine filtration means of a coastal nuclear power plant, through a combined analysis of environmental and operational data.

It allows predicting, at least four hours before each new tide, the occurrence of an influx of clogging agents during the coming tide, a tide being defined as the interval between two high tides of the ocean.

Often an influx of clogging agents consists of clogging the fine filtration means (filtering drums) of a power production facility such as a coastal nuclear plant with debris that is of plant, animal, or sedimentary origin, resulting from exceptional behavior of the environment. A typical example is the combination of a high tidal coefficient, a strong wind, and an estuary loaded with sediment by a river during a period of high flow. The invention therefore proposes using a score that is a probability of a massive influx of clogging agents during the coming tide, and an alert threshold for proposing that the site take measures against a massive influx of clogging agents by applying solutions (such as disengaging production pumps), because clogging elements cause a significant loss of energy production and require costly cleanup operations.

Preferably, an influx of dogging elements (or "detritus") is predicted by statistical techniques as presented above and a clogging risk is evaluated quantitatively. This choice of modeling and of a decision rule for producing the probability score and the alert threshold have proven satisfactory for the intended application.

The estimation of clogging probability is based on statistical modeling of the explanatory variables of the phenomenon (the most influential) combined with statistical modeling of certain sensor data from the pumping station, which include the dates and times that rotation of the drum is triggered at an average speed (MV) and high speed (GV) of the fine filtration means.

As indicated above, one can choose six descriptors upon which a Parzen-window statistical method is based.

They may be derived from explanatory environmental variables such as:
  hydrological (for example times of the high or low tide, tidal coefficients, the average daily flow rate of rivers or streams having an estuary such as the Garonne or the Dordogne in France, and their water level), and
  meteorological (wind speed and direction).

For the management of these descriptors, two parameters are then involved in the above classification step:
  the standard deviation of Gaussians used in the Parzen-window method (denoted sigma in FIGS. 4a and 4b), and
  a threshold used for allocation to one or the other of the classes after the probabilities are calculated (denoted K in FIG. 4b).

The threshold K may be determined by trial and error testing.

However, more generally, to determine the values of these parameters, a cross-validation method is used which consists of performing a series of classification tests using historical tide data for different parameter values (statistical learning).

In one exemplary embodiment, one proceeds specifically as follows:
  a grid of sigma and K values to be tested is defined, then, for each pair of values (sigma, K):
    the historical tide data are randomly separated into two subsets:
      a learning subset (80%) and
      a test subset (20%)
    such that within each subset, a ratio of number of tides with clogging agents/number of tides without clogging agents is preserved;
  The tides of the learning subset are used to define the likelihood functions associated with the two classes.
  The classification rule so defined is applied to the tides of the test subset.
  Among the tides of the test subset, classification errors are counted by distinguishing between false positives (non-clogging tide assigned to the class of clogging tides) and false negatives (clogging tide assigned to the class of non-clogging tides).
  The composition of the subsets is reiterated a selected number of times (several hundred iterations for example) while changing the learning and test subsets from one iteration to the next (random draw). Finally, the average number of false positives and false negatives in the chosen number of iterations is considered. This yields a point in the "number of false negatives" VERSUS "number of false positives" plane.

Figure 5:
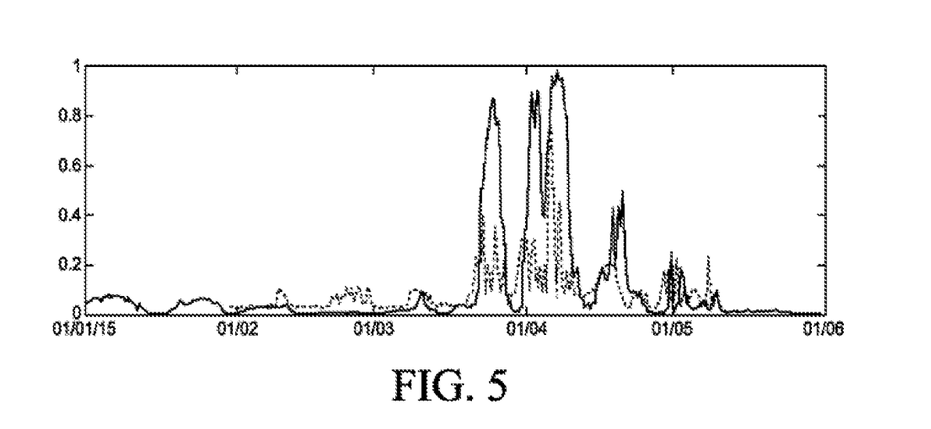
FIG. 5 shows a timeplot of clogging probability, compared with a screen headloss measurement provided in real time by the sensor CAP.

In the example of FIG. 5, the solid curve shows the clogging probability obtained by setting the sigma parameter to 2.5 and the threshold to 130. This curve thus illustrates the evolution over time of the probability after the fact, which is expressed as a function of sigma and of the threshold. It is compared to the screen headloss measured by the sensor CAP, shown in dotted lines for the same period.

In practice, however, the two parameters are varied in order to attempt to come as close as possible to 0 false positives and 0 false negatives. In the illustrated case, the parameter values that gave the smallest number of false positives while allowing 1 (one) false negative were selected (which represented the best compromise).

It turned out also that the Parzen-window method is the one that gives the best results in estimating the clogging risk.

Of course, the statistical results can be further refined using data from future tides, both clogging and non-clogging.

It is also possible to use a large number of descriptors, which reduces the error rate. However, the results obtained with six descriptors have a satisfactory error rate.

In addition, an advantageous descriptor may consist of estimating the difference in water level between the inside and the outside of the filtering drums (called the "screen headloss"). In effect, when the headloss exceeds a threshold, the plant is usually shut down automatically. Thus, rather than estimating a binary variable (clogging or non-clogging) which corresponds to whether or not said critical threshold is exceeded, the amount which is of interest, corresponding to the screen headloss, can be estimated quantitatively and can have more than two possible reactions.

A warning device can then be provided which operates as follows:
  a message is sent automatically (for example an email) four hours before each new tide,
  each message contains a prognosis concerning the occurrence or absence of clogging during the next tide interval, as shown in the example below:
    "Prognosis for the tide interval from 16/11/2015 8:29:00 to 16/11/2015 20:50:00
    Tide predicted to be non-clogging
    Details:
  clogging tide probability: 0.05
  non-clogging tide probability: 0.95
    Date of next prognosis: 16/11/2015 16:43:00"

A version with a user interface may also be provided, allowing the user to adjust application parameters (changes to the learning set, parameter values, recipients of automatic emails, etc.) and rerun prognoses for past tides.

The various steps that result in sending an email are:
- reading the data currently in the memory of the warning device,
- downloading the latest data to supplement the database maintained in memory (flow rate measurements, water level measurements, data on operation of filtering drums)
- from these data, calculating the six descriptors associated with the next tide,
- applying the Parzen-window method to determine the class of the next tide (as well as calculating a clogging probability, provided for indicative purposes).

It will thus be understood that the Parzen-window method is applied to two classes: the clogging tides and the non-clogging tides. Thus, clogging events are included in the learning history, but periods without clogging are included as well.

It is therefore possible to provide plant operators with a tool to assist with generator control. Operators already use a number of indicators to assess clogging risk for filtering drums. By implementing the invention, it is possible to assess the clogging risk more accurately.

Of course, the present invention is not limited to the embodiments described above by way of examples; it extends to other variants.

For example, the method using the Parzen approach presented above can have variations.

Indeed, in an analysis of recent years, this method shows correct average behavior. However, variants can be considered, particularly in order to reduce false positives. Indeed, a method based on a Parzen-window approach can be criticized in that it seems to have little justification mathematically, which could lessen its generic applicability.

In order to be more accurate, the Parzen-window approach requires empiric calibration by a coefficient specific to the operating site, although its meaning is not tied to a particular or useful property. The Parzen-window approach therefore has room for improvement and it should be possible to defend the method used by logical mathematical rules, regardless of the case considered. In addition, the Parzen-window approach ignores the correlation between covariates, which limits its predictive power.

Furthermore, an issue related to probabilistic prediction of a massive influx of clogging agents, via its probability of occurrence, is that of predicting a pressure difference indicator $\Delta_P$ on a particular production unit. This differential measures the pressure exerted by the water (headloss) retained due to clogging on the fine filtration means (filtering drums for example). The measurement can be produced by chains of sensors. When this pressure difference reaches a minimum threshold level, the production pumps are automatically controlled so as to safeguard the untreated water filtration function in the path concerned.

This pressure difference indicator $\Delta_P$ can therefore reveal a clogging phenomenon in the pumping station, and if its range of values can be predicted as a function of the covariates, it is a tool that provides more fine-tuned control (because focused on one or more waterways of a generator) than the probability of an imminent influx of clogging agents (hereinafter denoted ICA). It is natural to describe this indicator as a random variable, connected to the multivariate variable describing the ICA by a general probabilistic model. The probabilistic model which enables accurately calculating the probability of an imminent ICA becomes a sub-model of the above general model. One can thus see that one can have an indicator in addition to just the probability of an ICA to flesh out the model.

The ICA detection method, characterized by a probabilistic response (probability of an ICA occurring within four hours), can be noticeably improved by:
- a theoretical mathematical formalization of the calculation of this response: the classifier which is reconstructed is in practice a direct statistical modeling of the optimum Bayesian classifier defined by this formalization;
- a calculation method based on the assumed random character of each covariate of the problem: the calculation strategy is based on a "copula" distribution in more than two dimensions; it takes advantage of the fact that the covariates of the problem can be considered as random variables and not as deterministic variables or indexing parameters (such as time, for example); it allows considering the problem of supervised classification as statistical learning based on a comparison of several probabilistic models;
- the possibility of managing covariates potentially unmeasured during the prediction step (for example because the databases were not provided with data in time), which improves the overall robustness of the method;
- self-calibration of the method to allow periodic updating as tides occur, without needing to introduce additional adjustment parameters, which then gives it a more generic nature enabling deployment at any site.

Concerning the general definition of the invention wherein a step is provided for developing a statistical model based on historical data for parameters relating to the watercourse for which clogging of filters has been observed, it is understood that in this alternative embodiment, the historical clogging data for the filters can be added to the existing historical data.

The detection method according to this embodiment thus proposes a prediction of the value of the pressure differential at the filtration means (for example filtering drums) during the next tide. This prediction is probabilistic and provides the entire predictive distribution of the pressure differential, along with the main relevant statistics (for example the median, the mean, extreme quantiles, etc.). This method uses the same statistical tools as the detection method and can also handle the absence of measurements for certain variables.

It has been found that this alternative embodiment significantly improves the reduction in false positives. True positives are also properly detected for recent statistical surveys.

The invention claimed is:

1. A method for assisting with the management of a pumping device comprising:
   supplying a circuit of a power production facility, with water taken from a natural watercourse, the water upstream of the circuit comprising materials liable to clog one or more filters provided at the inlet to the circuit, wherein at least parameters relating to the watercourse and having an influence on the quantity of materials likely to clog said filters are collected, and:
   during a previous step, a statistical model is developed that is at least based on historical data for said parameters relating to the watercourse for which clogging of the filters has been observed,
   during a current step, current parameters relating to at least the watercourse are collected and said statistical model is used in conjunction with said current parameters to assess a risk of an influx of clogging materials, and an alert signal for deactivating the pumping device at a selected time is generated on the basis of the assessed risk.

2. The method according to claim 1, wherein the alert signal is generated for the further purpose of deactivating the pumping device for a duration selected in accordance with the assessed risk.

3. The method according to claim 1, wherein the water comprises seawater, and said parameters relating to the watercourse include at least one tidal coefficient.

4. The method according to claim 3, wherein said parameters relating to the watercourse include hydrological data from at least one high tide/low tide.

5. The method according to claim 1, wherein the water comprises water from a river, and said parameters relating to the watercourse include hydrological data comprising an average flow rate and a water level in the river.

6. The method according to claim 1, wherein the parameters relating to the watercourse include meteorological data on the speed and direction of the wind relative to the watercourse.

7. The method according to claim 1, wherein, during the current step, the current clogging parameters for said filters are further collected and the statistical model is used with:
current parameters relating to the watercourse, and
current clogging parameters.

8. The method according to claim 7, wherein the filters comprise filtering drums rotated so as to eject some or all of the clogging materials, the rotational speed of the drums being controlled on the basis of clogging information collected by at least one sensor, and wherein said clogging parameters include clogging information collected by said sensor.

9. The method according to claim 7, wherein the statistical model applied is derived from the Parzen-window method with descriptors comprising:
parameters relating to the watercourse, and
clogging parameters.

10. A computer program comprising instructions for implementing the method according to claim 1, when said program is executed by a processor.

11. A device for assisting with the management of a pumping device, comprising a circuit for implementing the method according to claim 1.

* * * * *